United States Patent
Wu et al.

(10) Patent No.: US 10,739,439 B2
(45) Date of Patent: Aug. 11, 2020

(54) LASER POSITIONING SYSTEM AND POSITION MEASURING METHOD USING THE SAME

(71) Applicant: INDUSTRIAL TECHNOLOGY RESEARCH INSTITUTE, Hsinchu (TW)

(72) Inventors: Chun-Te Wu, Taoyuan (TW); Chieh-Chih Wang, Taipei (TW); Chung-Hsun Wang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1 day.

(21) Appl. No.: 16/184,533

(22) Filed: Nov. 8, 2018

(65) Prior Publication Data

US 2019/0339363 A1 Nov. 7, 2019

(30) Foreign Application Priority Data

May 4, 2018 (TW) .............................. 107115269 A
Jul. 23, 2018 (TW) .............................. 107125382 A

(51) Int. Cl.
*G01S 7/481* (2006.01)
*G01S 17/42* (2006.01)

(52) U.S. Cl.
CPC .............. *G01S 7/481* (2013.01); *G01S 17/42* (2013.01)

(58) Field of Classification Search
CPC .......... G01S 17/02; G01S 17/04; G01S 17/06; G01S 17/08; G01S 17/10; G01S 17/14;
(Continued)

(56) References Cited

U.S. PATENT DOCUMENTS 4,846,297 A 7/1989 Field et al.
5,039,217 A * 8/1991 Maekawa ................ G01C 3/18
356/3.01
(Continued)

FOREIGN PATENT DOCUMENTS

CN 102818568 A 12/2012
CN 103645733 A 3/2014
(Continued)

OTHER PUBLICATIONS

Taiwanese Office Action and Search Report dated Dec. 11, 2018 for Application No. 107125382.
(Continued)

*Primary Examiner* — Gordon J Stock, Jr.
(74) *Attorney, Agent, or Firm* — Birch, Stewart, Kolasch & Birch, LLP

(57) ABSTRACT

A laser positioning system includes a laser scanner, a first positioning tag, a second positioning tag, and a processing unit. The laser scanner is disposed on a mobile carrier and is for emitting a light beam to a positioning board and receiving a plurality of reflected light spot signals generated by the light beam reflected from the positioning board. The first positioning tag and the second positioning tag are for reflecting the light beam to generate a first positioning signal and a second positioning signal to the laser scanner. The processing unit is for finding information of positions of the light beam projected on the first positioning tag and the second positioning tag, and filtering the reflected light spot signals to define a reference coordinate for the processing to calculate relative positions of the laser scanner and the positioning board according to the reference coordinate.

23 Claims, 5 Drawing Sheets

(58) Field of Classification Search
CPC .......... G01S 17/18; G01S 17/26; G01S 17/32;
G01S 17/34; G01S 17/03; G01S 17/42;
G01S 17/46; G01S 17/48; G01S 17/66;
G01S 17/88; G01S 17/89; G01S 17/894
USPC ..................................... 356/3–5.08, 614–620
See application file for complete search history.

(56) References Cited

U.S. PATENT DOCUMENTS

| | | | | |
|---|---|---|---|---|
| 5,118,191 | A | 6/1992 | Hopkins | |
| 5,204,731 | A * | 4/1993 | Tanaka | G01C 15/00 |
| | | | | 356/141.1 |
| 5,313,262 | A * | 5/1994 | Leonard | B60T 1/16 |
| | | | | 356/4.01 |
| 6,675,122 | B1 * | 1/2004 | Markendorf | G01C 15/002 |
| | | | | 356/614 |
| 6,697,147 | B2 | 2/2004 | Ko et al. | |
| 7,436,522 | B2 * | 10/2008 | Steinbichler | G01B 11/002 |
| | | | | 356/141.4 |
| 7,460,250 | B2 * | 12/2008 | Keightley | G01B 11/25 |
| | | | | 250/236 |
| 7,728,963 | B2 * | 6/2010 | Kirschner | G01S 17/42 |
| | | | | 356/141.2 |
| 7,913,405 | B2 * | 3/2011 | Berg | G01C 15/06 |
| | | | | 33/228 |
| 8,567,076 | B2 * | 10/2013 | Ortleb | G01C 15/06 |
| | | | | 33/228 |
| 8,681,317 | B2 * | 3/2014 | Moser | G01S 17/86 |
| | | | | 356/3.09 |
| 9,322,654 | B2 * | 4/2016 | Bockem | G01C 15/002 |
| 9,395,296 | B1 | 7/2016 | Milton et al. | |
| 9,400,175 | B2 * | 7/2016 | Luthi | G01C 15/002 |
| 9,443,311 | B2 * | 9/2016 | Hallett | G06F 3/03545 |
| 9,561,019 | B2 * | 2/2017 | Mihailescu | A61B 6/4258 |
| 9,612,331 | B2 * | 4/2017 | Kwiatkowski | G01S 17/42 |
| 9,686,532 | B2 * | 6/2017 | Tohme | G01C 15/002 |
| 9,739,616 | B2 | 8/2017 | Wang et al. | |
| 10,048,379 | B2 * | 8/2018 | Markendorf | G01S 17/86 |
| 10,162,058 | B2 * | 12/2018 | Shaffer | G01S 17/04 |
| 10,261,183 | B2 * | 4/2019 | Smits | G01S 17/89 |
| 10,408,604 | B1 * | 9/2019 | Ebrahimi Afrouzi | G01B 11/14 |
| 2010/0157280 | A1 * | 6/2010 | Kusevic | G01S 7/4972 |
| | | | | 356/4.01 |
| 2010/0164807 | A1 * | 7/2010 | Tseng | G01S 5/0247 |
| | | | | 342/386 |
| 2011/0142138 | A1 | 6/2011 | Tian et al. | |
| 2014/0373369 | A1 | 12/2014 | Böckem | |
| 2016/0252619 | A1 * | 9/2016 | Markendorf | G01S 17/08 |
| | | | | 356/3.01 |
| 2019/0265721 | A1 * | 8/2019 | Troy | G01C 21/005 |

FOREIGN PATENT DOCUMENTS

| | | |
|---|---|---|
| CN | 104950892 A | 9/2015 |
| CN | 104102222 B | 3/2017 |
| CN | 104750115 B | 3/2017 |
| TW | 370186 U | 9/1999 |
| TW | 200742600 A | 11/2007 |
| TW | 201044322 A1 | 12/2010 |
| TW | 201738986 A | 11/2017 |

OTHER PUBLICATIONS

Govindarajan et al., "Target Design and Recognition for 2-D Localization of Indoor Mobile Robots Using a Laser Sensor", 6th IFAC Symposium on Mechatronic Systems, The International Federation of Automatic Control, Apr. 10-12, 2013, Hangzhou, China, pp. 67-74.

Nguyen et al., "A Comparison of Line Extraction Algorithms using 2D Laser Rangefinder for Indoor Mobile Robotics", 2005 IEEE/RSJ International Conference on Intelligent Robots and Systems, Date of Conference: Aug. 2-6, 2005, total 6 pages.

Zhang, "Iterative Point Matching for Registration of Free-Form Curves and Surfaces", International Journal of Computer Vision, 1994, vol. 13, No. 2, pp. 119-152.

* cited by examiner

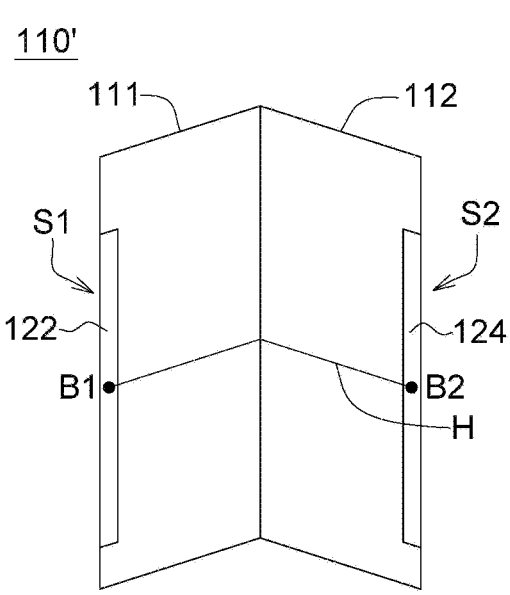

FIG. 5A

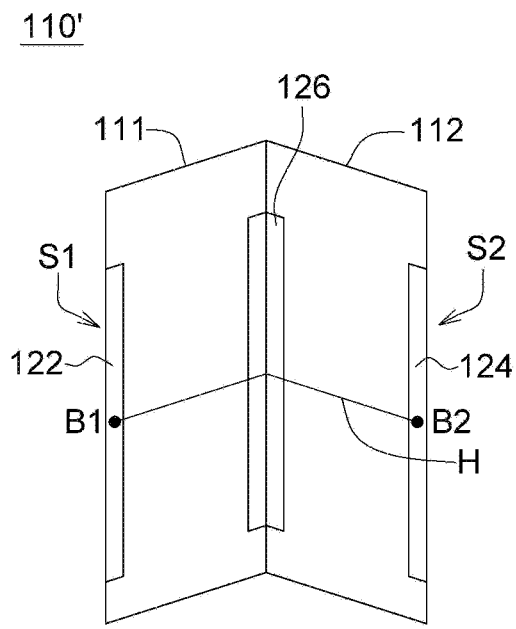

FIG. 5B

| Project a light beam on a first positioning tag, a positioning board and a second positioning tag to correspondingly generate a first positioning signal, multiple reflected light spot signals and a second positioning signal | S21 |

↓

| Find information of positions of the light beam projected on the first positioning tag and the second positioning tag according to light intensities of reflected light signals | S22 |

↓

| Filter the reflected light spot signals according to information of the positions of the light beam projected on first positioning tag and second positioning tag to obtain reflected light spot signals within an interval between the first positioning tag and the second positioning tag | S23 |

↓

| Find a set of matching point cloud according to the reflected light spot signals within the interval to define a reference coordinate of positioning board to calculate relative positions of the laser scanner and the positioning board | S24 |

FIG. 6

LASER POSITIONING SYSTEM AND POSITION MEASURING METHOD USING THE SAME

This application claims the benefits of Taiwan application Serial No. 107115269, filed May 4, 2018 and Taiwan application Serial No. 107125382, filed Jul. 23, 2018, the disclosures of which are incorporated by reference herein in its entirety.

TECHNICAL FIELD

The disclosure relates to a laser positioning system and a position measuring method using this system, and more particularly to a laser positioning system for enhancing laser positioning accuracy and a position measuring method using this system.

BACKGROUND

With evolving eras, a new industrial manufacturing mode has transformed from mass production to flexible manufacturing in small amounts and diversity, hence requiring frequent changes in production lines and automated carrier systems with flexibilities. An automated Guided Vehicle (AGV) is an essential carrier in automated material transportation, and features advantages of occupying minimal space and production lines that can be flexibility adjusted. From the aspect of techniques, the object of positioning is accomplished by means of laser, magnetic columns and two-dimensional barcode tags. Among various techniques, laser map comparison and guiding method has an immense advantage. The positioning calculation of the laser map comparison and guiding method can be divided into two parts: calculation of global positioning in an entire environment, and calculation of fine positioning by using landmark features. Currently, only the contour of the landmark is used for positioning calculation. However, because the signal of a laser scanner includes noise and the noise is also generated when laser reaches edges of the landmark, achieving positioning having position accuracy under a millimeter scale can be quite challenging.

SUMMARY

The disclosure is directed to a laser positioning system and a position measuring method using the same, in which positioning tags serving as positioning auxiliary labels are attached on a laser positioning board, and relative positions and distances of a laser scanner and a positioning board are calculated.

According to an aspect of the disclosure, a laser positioning system for positioning a mobile carrier is provided. The laser positioning system includes a positioning board, a laser scanner, a first positioning tag, a second positioning tag and a processing unit. The laser scanner is disposed on the mobile carrier, and is for emitting a light beam to the positioning board and receiving a plurality of reflected light spot signals generated by the light beam reflected from the positioning board when the laser scanner scans from a first region of the positioning board to a second region of the positioning board. The first positioning tag is disposed in the first region of the positioning board, and is for reflecting the light beam to generate a first positioning signal to the laser scanner. The second positioning tag is disposed in the second region of the positioning board, and is for reflecting the light beam to generate a second positioning signal to the laser scanner. The processing unit is for finding information of a position of the light beam projected on the first positioning tag and information of a position of the light beam projected on the second positioning tag, and filtering the light spot signals to define a reference coordinate, for the processing unit to calculate relative positions of the laser scanner and the positioning board according to the reference coordinate.

According to an aspect of the disclosure, a position measuring method for positioning a mobile carrier is provided. The mobile carrier is provided with a laser scanner. The position measuring method includes the following steps. The laser scanner projects a light beam on a first positioning tag, a positioning board and a second positioning tag to correspondingly generate a first positioning signal, a plurality of reflected light spot signals and a second positioning signal. The first positioning tag and the second positioning tag are disposed on two opposite regions of the positioning board. A processing unit finds information of positions of the light beam projected on the first positioning tag and the second positioning tag, and filters these reflected light spot signals to define a reference coordinate for the processing unit to calculate relative position of the laser scanner and the positioning board according to the reference coordinate.

To better understand the above and other aspects of the disclosure, embodiments are given in detail with the accompanying drawings below.

BRIEF DESCRIPTION OF THE DRAWINGS

FIG. 5A and FIG. 5B are front schematic diagrams of a positioning board according to another embodiment; and FIG. 6 is a flowchart of a position measuring method according to an embodiment.

DETAILED DESCRIPTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

A laser positioning system for positioning a mobile carrier is provided according to an embodiment. The mobile carrier is, for example, an unmanned transportation vehicle, an unmanned aircraft, a self-propelled robot or an unmanned transportation device. With the laser positioning system of the embodiment, the distance or coordinates of a mobile carrier relative to a target can be accurately measured when the mobile carrier moves on the ground or within a factory, or is airborne in a three-dimensional space, so as to ensure that the mobile carrier can automatically move to a work station or stop on a location point.

Figure 1:
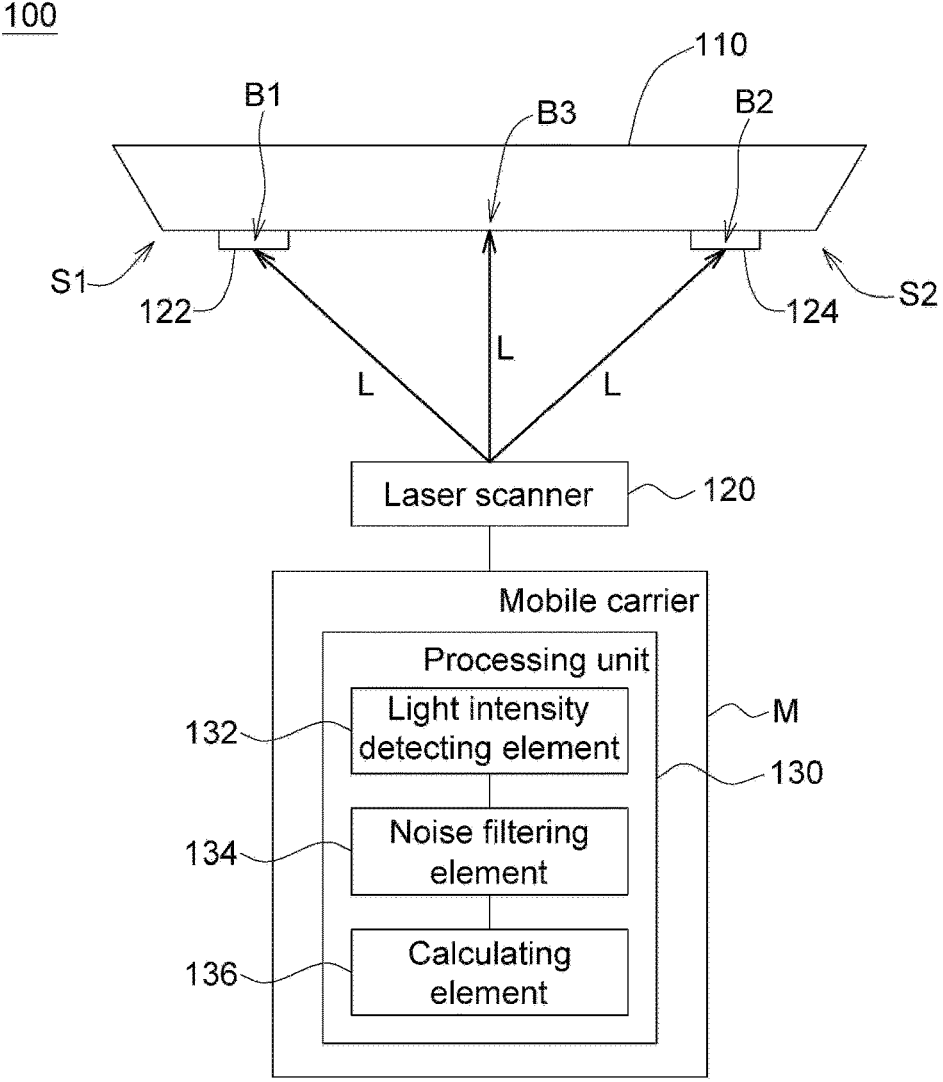
FIG. 1 is a schematic diagram of a laser positioning system according to an embodiment.
Figure 2:
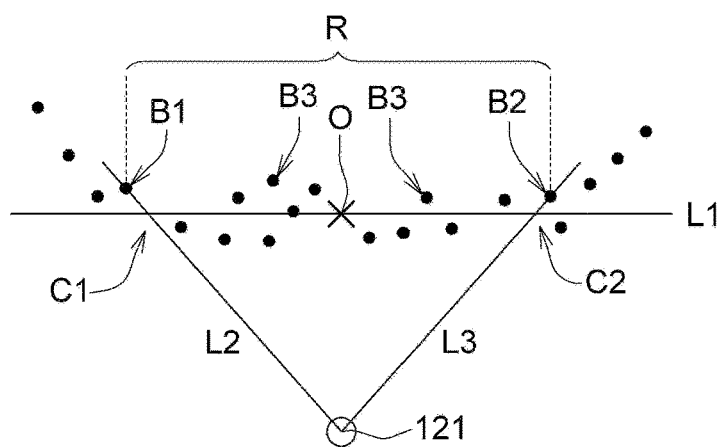
FIG. 2 is a schematic diagram of defining a reference coordinate by using reflected light spot signals and positioning signals according to an embodiment.
Figure 3A:
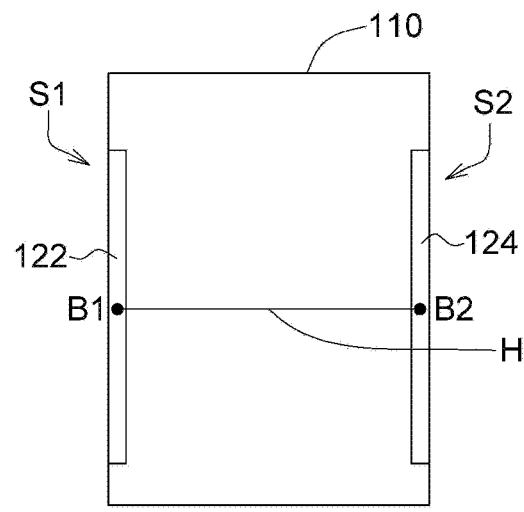
FIG. 3A and FIG. 3B are front schematic diagrams of a positioning board corresponding to different embodiments.
Figure 3B:
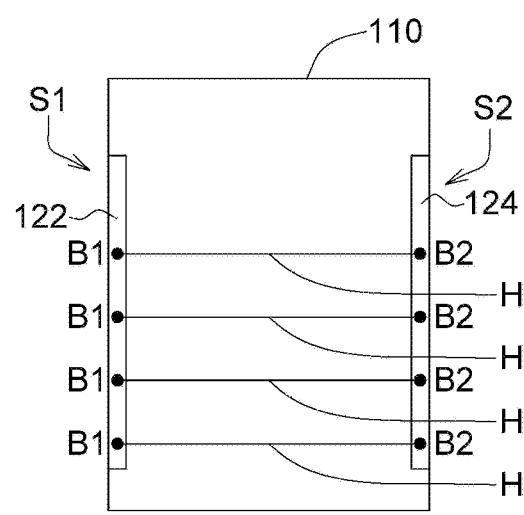

FIG. 1 shows a schematic diagram of a laser positioning system 100 according to an embodiment. FIG. 2 shows a schematic diagram of defining coordinates by using reflected light spot signals B3 and positioning signals B1 and B2. FIG. 3A and FIG. 3B respectively show front schematic diagrams of positioning boards 110 and 110' corresponding to different embodiments.

Referring to FIG. 1 and FIG. 2, in one embodiment, the laser positioning system 100 includes a positioning board 110, a laser scanner 120, a first positioning tag 122, a second positioning tag 124 and a processing unit 130. The laser scanner 120 is disposed on a mobile carrier M, and is for emitting a light beam L to the positioning board 110, and receiving multiple reflected light spot signals B3 generated by the light beam L reflected from the positioning board 110 when the laser scanner 120 scans from a first region S1 to a second region S2 of the positioning board 110. The first positioning tag 122 is disposed in the first region S1 of the positioning board 110, and is for reflecting the light beam L to generate the first positioning signal B1 to the laser scanner 120. The second positioning tag 124 is disposed in the second region S2 of the positioning board 110, and is for reflecting the light beam L to generate a second positioning signal B2 to the laser scanner 120.

As described above, in a specific region of the positioning board 110, for example, in edges near the first region S1 and the second region S2 of the positioning board 110, light-reflecting tag or stickers that are capable of reflecting light beam or enhance the intensity of a reflected light signal are attached to serve as the first positioning tag 122 and the second positioning tag 124 in the laser positioning system 100 of the embodiment. Alternatively, light-absorbing tags or stickers capable of absorbing light beam or weakening the intensity of a reflected light signal are attached to specific regions of the positioning board 110 to serve as the first positioning tag 122 and the second positioning tag 124. Thus, the laser positioning system 100 can determine whether the light beam L is projected on the first positioning tag 122 and the second positioning tag 124 according to the intensity of reflected light signal.

In one embodiment, by measuring the intensity of the reflected light signal, the light intensities of the first positioning signal B1 and the second positioning signals B2 are greater than the light intensity of the reflected light spot signals B3 (e.g., greater than twice of the light intensity of the reflected light spot signals B3), or smaller than the light intensity of the reflected light spot signals B3 (e.g., smaller than one-half of the light intensity of the reflected light spot signals B3), such that the laser positioning system 100 can be clearly find the positions of the light beam L projected on the first positioning tag 122 and the second positioning tag 124 and positions of reflected light spots of the light beam L projected on the positioning board 110.

Referring to FIG. 1 and FIG. 2, when the laser scanner 120 scans from the first region S1 to the second region S2 of the positioning board 110, the light beam L sequentially projects on the first positioning tag 122, the positioning board 110 and the second positioning tag 124, and sequentially generates the first positioning signal B1, the multiple reflected light spot signals B3 and the second positioning signal B2. The first positioning signal B1 represents position information of the light beam L projected on the first positioning tag 122. By calculating the flight time and the angle of the light beam L, the distance and the angle of the laser scanner 120 relative to the first positioning tag 122 can be determined. Further, the position of the light beam L projected on the first positioning tag 122 is necessarily located on a first line L2 formed by connecting the first positioning tag 122 and a emitting center position 121 of the laser scanner 120. Thus, the relative position information of the first positioning tag 122 and the laser scanner 120 can be determined. The second positioning signal B2 represents position information of the light beam L projected on the second positioning tag 124. By calculating the flight time and the angle of the light beam L, the distance and the angle of the laser scanner 120 relative to the second positioning tag 124 can be determined. Further, the position of the light beam L projected on the second positioning tag 124 is necessarily located on a second line L3 formed by connecting the second positioning tag 124 and the emitting center position 121 of the laser scanner 120. Thus, relative position information of the second positioning tag 124 and the laser scanner 120 can be determined.

The reflected light spot signals B3 represent the position of the light beam L projected on the positioning board 110. By calculating the flight time and the angle of light beam L, the distances and angles of the laser scanner 120 relative to reflected light spots on the positioning board 110 can be roughly estimated. If the first positioning tag 122 and the second positioning tag 124 are not disposed on the positioning board 110, and the distances and the angles of the laser scanner 120 relative to the reflected light spots on the positioning board 110 are estimated only according to the reflected light spot signals B3, because noise signals are likely generated at the edges of the positioning board when the reflected light spots are generated near the first region S1 and the second region S2, accurate positioning cannot be achieved. In the laser positioning system 100 of the embodiment, the first positioning tag 122 and the second positioning tag 124 are disposed on the positioning board 110 to serve as auxiliary positioning labels, such that noise signals that generates at edge regions can be filtered out and the reflected light spot signals B3 within the specific regions R can be identified, thereby enhancing laser positioning accuracy.

Referring to FIG. 1 and FIG. 2, the processing unit 130, such as a data processor for executing a program stored in the non-volatility memory, is for finding the position information of the light beam L projected on the first positioning tag 122 and the second positioning tag 124, and filtering the reflected light spot signals B3 to define a reference coordinate. In one embodiment, the processing unit 130 includes, for example, a light intensity detecting element 132, a noise filtering element 134 and a calculating element 136. The light intensity detecting element 132 finds, according to the light intensity of the first positioning signal B1 and the light intensity of the second positioning signal B2, the position information of the light beam L projected on the first positioning tag 122 and the second positioning tag 124, respectively. The noise filtering element 134 filters these reflected light spot signals B3 according to the positions of the light beam L projected on the first positioning tag 122 and the second positioning tag 124, so as to capture the reflected light spot signals B3 within an interval R between the first positioning tag 122 and the second positioning tag 124.

That is to say, the processing unit 130 is capable of removing noise signals on the outer regions of the first positioning tag 122 and the second positioning tag 124, and capturing only the reflected light spot signals B3 between the first positioning tag 122 and the second positioning tag 124 to define a regression line L1. In one embodiment, the calculating element 136 defines the regression line L according to a least square function of the reflected light spot signals B3 within the interval R. In the embodiment, a linear regression of least square method is adopted to find an equation of the regression line L1 most appropriately representing the reflected light spot signals B3, with the definitions as below:

Standard deviation of variable X:

$$S_x = \sqrt{\frac{\sum_{1}^{n}(x_k - \bar{x})^2}{n}},$$

where $\bar{X}$ is an average of X;

Standard deviation of variable Y:

$$S_y = \sqrt{\frac{\sum_{1}^{n}(y_k - \bar{y})^2}{n}},$$

where $\bar{Y}$ is an average of Y;

Correlation coefficient of variables X and Y:

$$r = \frac{\sum_{1}^{n}(x_k - \bar{x})(y_k - \bar{y})}{\sqrt{\sum_{1}^{n}(x_k - \bar{x})^2 \sum_{1=0}^{n}(y_k - \bar{y})^2}};$$

and

Equation of the regression line L1:

$$y - \bar{y} = r * \frac{S_y}{S_x}(x - \bar{x}).$$

FIG. 2 depicts a regression line L1 most appropriately representing the reflected light spot signals B3. Next, the laser positioning system 100 uses the regression line L1 and the position information of the light beam L projected on the first positioning tag 122 and the second positioning tag 124 to define a coordinate axis, for the processing unit 130 to calculate the relative positions of the laser scanner 120 and the positioning board 110 by using the coordinate axis as a reference coordinate. As shown in FIG. 1 and FIG. 2, in one embodiment, the calculating element 136 can determine the first line L2 connecting the first positioning tag 122 and the emitting center position 121 of the laser scanner 120 according to the known position information of the first positioning tag 122, obtain a first intersection C1 by intersecting the first line L2 and the regression line L1, determine the second line L3 connecting the second positioning tag 124 and the emitting center position 121 of the laser scanner 120 according to the known position information of the second positioning tag 124, and obtain a second intersection C2 by intersecting the second line L3 and the regression line L1. Further, the calculating element 136 uses an intermediate point (represented by O) of the first intersection C1 and the second intersection C2 as an origin of the coordinate axis to calculate the relative positions of the laser scanner 120 and the positioning board 110. It should be noted that, the embodiment is not limited to using the intermediate point O as the origin of the coordinate axis, and the first intersection C1 or the second intersection C2 may also be used as the origin of the coordinate axis; the disclosure is not limited to the above examples.

Referring to FIG. 3A, the positioning board 110 is, for example, a flat plate which has a plane, and the first positioning tag 122 and the second positioning tag 124 are located on two opposite regions of the plane. The first positioning tag 122 and the second positioning tag 124 are, for example, light-reflecting tags, and are arranged along the longitudinal direction of the flat plate. However, the first positioning tag 122 and the second positioning tag 124 may also be block-shaped rather than being strip-shaped. When the laser beam L scans from the first region S1 to the second region S2 of the positioning board 110, a scanning beam H is formed on the positioning board 110, and angles of the laser light beam L projected on the two opposite regions of the plane can be determined through the light-reflecting tags. Thus, the processing unit 130 can identify two rays (i.e., the first line L2 and the second line L3) having a starting point at the laser emitting center position 121, and obtain two intersections (i.e., the first intersection C1 and the second intersection C2) by intersecting the two rays with the previously obtained regression line L1, so as to determine the reference coordinate for calculating the relative positions of the laser scanner 120 and the positioning board 110.

The laser scanner 120 is not limited to being a two-dimensional scanner that generates one single scanning beam H. In another embodiment, the laser scanner 120 may also be a three-dimensional scanner that generates multiple scanning beams H or a three-dimensional scanner consisting of at least two two-dimensional scanners. Referring to FIG. 3B, the laser scanner 120 can generate multiple scanning beams H arranged in parallel on the positioning board 110. Each of the scanning beams H identifies the regression line L1 and two intersections through the above algorithm, so as to determine the reference coordinate for calculating the relative positions of the laser scanner 120 and the positioning board 110 in a three-dimensional space.

Referring to FIG. 3B, another embodiment for three-dimensional scanning and positioning is given below. The positioning board 110 is, for example, a plane. First, the first positioning tag 122 and the second positioning tag 124 are disposed on two opposite regions of the positioning board 110, and multiple scanning beams H are projected on the positioning board 110. The two positioning tags may be parallel or non-parallel. The processing unit 130 can perform regression analysis on a least square function of the reflected light spot signals (i.e., data points $D_{lidar}$) between the first positioning tag 122 and the second positioning tag 124 to determine a plane equation, which is defined as: $f(x,y) = z = ax + by + c$, where a, b and c are unknown coefficients. Assume that the obtained data points $D_{lidar} = \{(x_k, y_k, z_k) | k \in [0,n]\}$ and n, k are positive integers, and the data points are substituted into the plane equations and written into a matrix form:

$$\begin{bmatrix} x_0 & y_0 & 1 \\ x_1 & y_1 & 1 \\ \cdots & \cdots & \cdots \\ x_n & y_n & 1 \end{bmatrix} \begin{bmatrix} a \\ b \\ c \end{bmatrix} = \begin{bmatrix} z_0 \\ z_1 \\ \cdots \\ z_n \end{bmatrix}$$

The plane equation is multiplied by the transpose matrix on the left to serve as a linear least square:

$$\begin{bmatrix} x_1 & x_1 & \ldots & x_n \\ y_1 & y_2 & \ldots & y_n \\ 1 & 1 & \ldots & 1 \end{bmatrix} \begin{bmatrix} x_0 & y_0 & 1 \\ x_1 & y_1 & 1 \\ \ldots & \ldots & \ldots \\ x_n & y_n & 1 \end{bmatrix} \begin{bmatrix} a \\ b \\ c \end{bmatrix} = \begin{bmatrix} x_0 & y_0 & 1 \\ x_1 & y_1 & 1 \\ \ldots & \ldots & \ldots \\ x_n & y_n & 1 \end{bmatrix} \begin{bmatrix} z_0 \\ z_1 \\ \ldots \\ z_n \end{bmatrix}$$

After organizing the above, an equation below is obtained:

$$\begin{bmatrix} \sum_{i=0}^{n} x_i x_i & \sum_{i=0}^{n} x_i y_i & \sum_{i=0}^{n} x_i \\ \sum_{i=0}^{n} y_i x_i & \sum_{i=0}^{n} y_i y_i & \sum_{i=0}^{n} y_i \\ \ldots & \ldots & \ldots \\ \sum_{i=0}^{n} x_i & \sum_{i=0}^{n} y_i & n \end{bmatrix} \begin{bmatrix} a \\ b \\ c \end{bmatrix} = \begin{bmatrix} \sum_{i=0}^{n} x_i z_i \\ \sum_{i=0}^{n} x_i z_i \\ \ldots \\ \sum_{i=0}^{n} z_i \end{bmatrix}$$

Thus, the three coefficients a, b and c can be obtained.

Once having solved the plane equation, the processing unit 130 determines, according to the position information of the positioning tags, the angles of the laser beam L projected on the two opposite regions of the plane, generates two rays (i.e., the first line L2 and the second line L3) regarding the laser emitting center as an origin, and obtains two intersections at which the two rays intersect with the positions of the positioning tags on the previously solved plane equation. By retrieving three or more of the above intersections, a reference coordinate can be defined, for the processing unit 130 to calculate the relative positions of the laser scanner 120 and the positioning board 110.

Figure 4A:
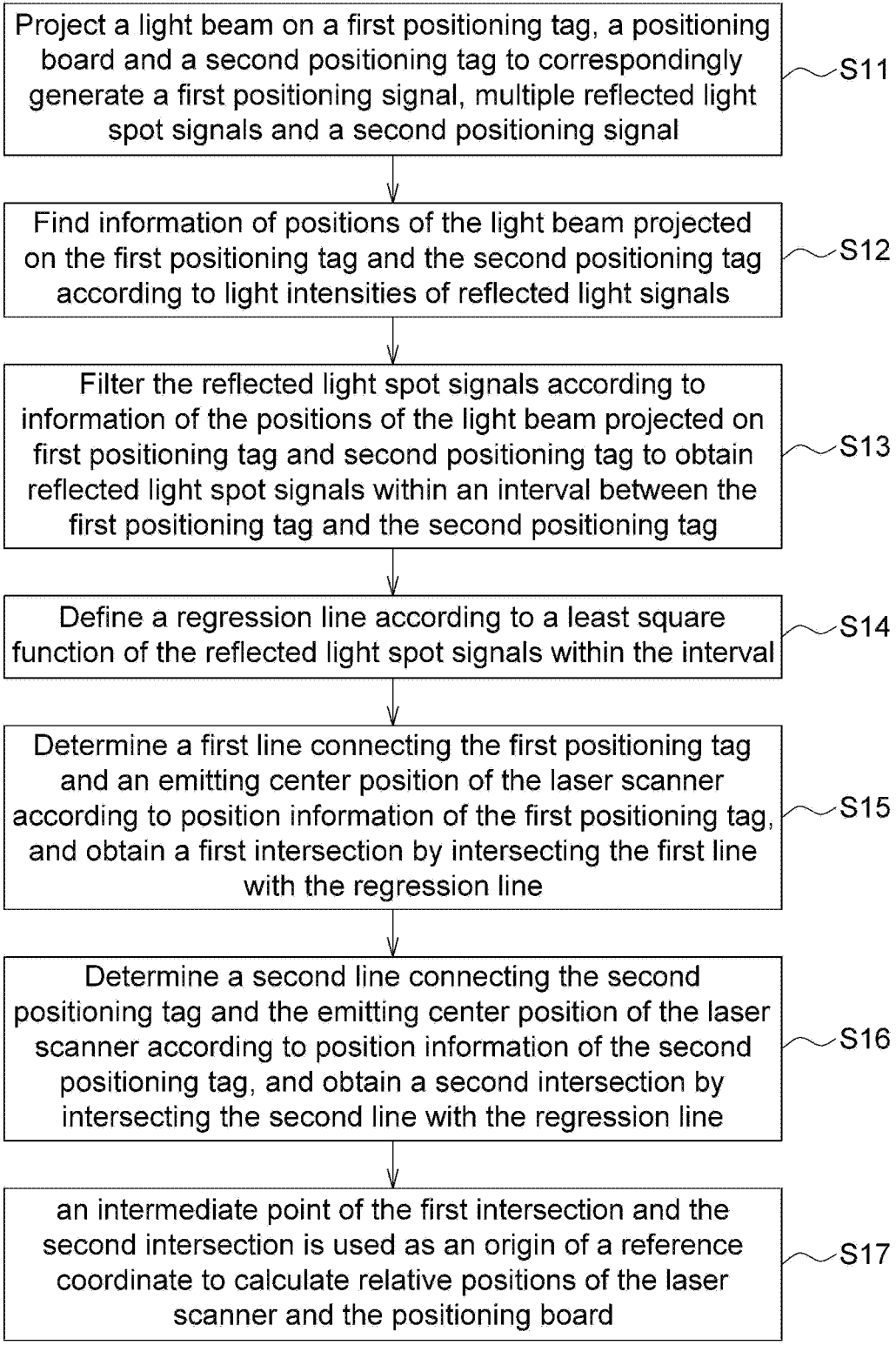
FIG. 4A and FIG. 4B are flowcharts of a position measuring method according to an embodiment.

A position measuring method for enhancing laser positioning accuracy is provided according to the embodiment in FIG. 3A. Referring to FIGS. 1, 2, 3A and 4A, wherein FIG. 4A shows a flowchart of a position measuring method 101 according to an embodiment. The position measuring method 101 includes steps S11 to S17 below.

In step S11, a light beam L is projected on the first positioning tag 122, the positioning board 120 and the second positioning tag 124 to correspondingly generate a first positioning signal B1, multiple reflected light spot signals B3 and a second positioning signal B2.

In step S12, position information of the light beam L projected on the first positioning tag 122 and position information of the light beam L projected on the second positioning tag 124 are found according to light intensities of light reflection signals.

In step S13, the reflected light spot signals B3 are filtered according to the position information of the light beam L projected on the first positioning tag 122 and the position information of the light beam L projected on the second positioning tag 124, so as to capture the reflected light spot signals B3 within an interval R between the first positioning tag 122 and the second positioning tag 124.

In step S14, a regression line L1 is defined according to a least square function of the reflected light spot signals B3 within the interval R.

In step S15, a first line L2 connecting the first positioning tag 122 and the emitting center position 121 of the laser scanner 120 is determined according to the position information of the first positioning tag 122, and a first intersection C1 is obtained by intersecting the first line L2 with the regression line L1.

In step S16, a second line L3 connecting the second positioning tag 124 and the emitting center position 121 of the laser scanner 120 is determined according to the position information of the second positioning tag 124, and a second intersection C2 is obtained by intersecting the second line L3 with the regression line L1.

In step S17, an intermediate point O of the first intersection C1 and the second intersection C2 is used as an origin of a coordinate axis, and relative positions of the laser scanner 120 and the positioning board 110 are calculated.

Figure 4B:
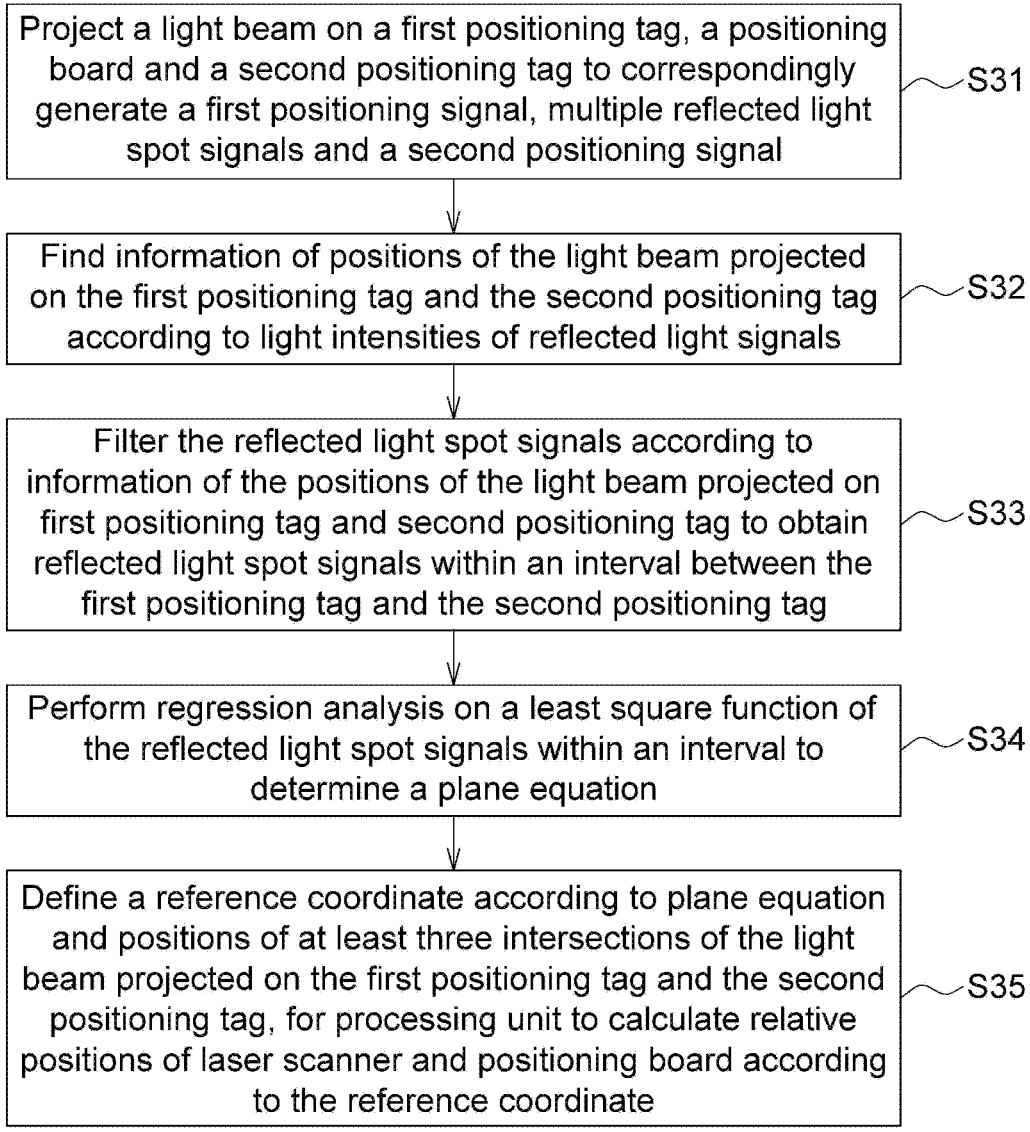

Another position measuring method for enhancing laser positioning accuracy is provided according to the embodiment in FIG. 3B. Referring to FIGS. 1, 2, 3B and 4B, wherein FIG. 4B shows a flowchart of a position measuring method 103 according to an embodiment. The position measuring method 103 includes steps S31 to S35 below. Steps S31 to S33 are similar to steps S11 to S13, and such repeated details are omitted herein. Referring to step S34, a plane equation is determined according to regression analysis performed on the least square function of the reflected light spot signals B3 within the interval R. In step S35, a reference coordinate is defined according to the plane equation and the positions of at least three intersections of the light beam projected on the first positioning tag 122 and the second positioning tag 124, for the processing unit 130 to calculate the relative positions of the laser scanner 120 and the positioning board 110 according to the reference coordinate.

The positioning board 110 is not limited to being a flat plate. In another embodiment, the positioning board 110 may have a specific shape, such as a V-shape, a W-shape (a zigzag shape), a trapezoid, a semicircle, an arc or a corrugated shape. In one embodiment, the processing unit 130 adopts a point cloud matching algorithm to identify a set of point cloud matching the surface shape of the positioning board 110, and thus the positioning board 110 may be any desired shape.

Referring to FIG. 5A, a positioning board 110' is a pair of plates connecting with each other. The pair of plates has, for example, two opposite surfaces 111 and 112 appearing V-shaped; the first positioning tag 122 and the second positioning tag 124 may be respectively located on the two opposite surfaces 111 and 122 appearing V-shaped, and are for filtering noise generated by reflected light beam at edges of positioning board. The processing unit 130 may determine a set of matching point cloud through a point cloud matching algorithm (e.g., an iterative closest point (ICP) algorithm) to calculate the relative positions of the laser scanner 120 and the positioning board 110'. Thus, the disclosure is not limited to being implemented by a linear regression least square method. In this embodiment, the processing unit 130 can determine point cloud matching the surface shape of the positioning board 110 according to point cloud data of the reflected light spot signals B3 to define the reference coordinate between the laser scanner 120 and the positioning board 110'.

A position measuring method 102 for enhancing laser positioning accuracy is provided according to the embodiment in FIG. 5A. Referring to FIG. 6, the position measuring method 102 includes steps S21 to S24 below.

In step S21, a light beam L is projected on the first positioning tag 122, the positioning board 110' and the second positioning tag 124 to correspondingly generate a first positioning signal B1, multiple reflected light spot signals B3 and a second positioning signal B2.

In step S22, position information of the light beam L projected on the first positioning tag 122 and position information of the light beam L projected on the second positioning tag 124 are found according to light intensities of light reflection signals.

In step S23, the reflected light dot signals B3 are filtered according to the position information of the first positioning tag 122 and the second positioning tag 124 to capture the reflected light spot signals B3 within an interval R between the first positioning tag 122 and the second positioning tag 124.

In step S24, a set of matching point cloud is determined according to the reflected light spot signals B3 within the interval R to define a reference coordinate of the positioning board 110, so as to calculate the relative positions of the laser scanner 120 and the positioning board 110.

Referring to FIG. 5B, in an embodiment, the positioning board 110' may have a third positioning tag 126 located on a boundary of the pair of plates where the two opposite surfaces 111 and 112 intersect. The first positioning tag 126 has the same function as the first and second positioning tags, and is for reflecting the light beam L to generate a third positioning signal to the laser scanner 120. Similar to the position measuring method 101 in FIG. 4, the position measuring method between the first positioning tag 122 and the third positioning tag 126 and the position measuring method between the second positioning tag 124 and the third positioning tag 126 may be performed respectively by defining a regression line according to a least mean square function of the reflected light spot signals B3, and the reference coordinate is then defined according to intersections on respective regression lines, so as to calculate the relative positions of the laser scanner 120 and the positioning board 110'.

In the laser positioning system and the position measuring method using the same disclosed by the above embodiments, positioning tags serving as positioning auxiliary labels are attached on a laser positioning board, and relative positions or relative distances of a laser scanner and a positioning board are calculated through an algorithm, thereby enhancing laser positioning accuracy.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A laser positioning system, comprising:
a positioning board;
a laser scanner, disposed on a mobile carrier, for emitting a light beam to the positioning board;
a first positioning tag, disposed on a first region of the positioning board, for reflecting the light beam to generate a first positioning signal;
a second positioning tag, disposed on a second region of the positioning board, for reflecting the light beam to generate a second positioning signal; and
a processing unit, for finding information of a position of the light beam projected on the first positioning tag and information of a position of the light beam projected on the second positioning tag;
wherein the laser scanner disposed on the mobile carrier receives a plurality of reflected light spot signals generated by the light beam reflected from the positioning board, and the processing unit filters the reflected light spot signals to define a reference coordinate to calculate the relative positions of the laser scanner and the positioning board.

2. The laser positioning system according to claim 1, wherein the
processing unit comprises:
a light intensity detecting element, for finding the information of the positions of the light beam projected on the first positioning tag and the second positioning tag according to a light intensity of the first positioning signals and a light intensity of the second positioning signal respectively.

3. The laser positioning system according to claim 2, wherein the first positioning tag and the second positioning tag are light-reflecting tags or light-absorbing tags.

4. The laser positioning system according to claim 2, wherein the light intensity of the first positioning signal and the light intensity of the second positioning signal are different from the light intensity of the reflected light spot signals.

5. The laser positioning system according to claim 1, wherein the processing unit comprises a noise filtering element for filtering the reflected light spot signals according to the information of the positions of the light beam projected on the first positioning tag and the second positioning, and then the reflected light spot signals within an interval between the first positioning tag and the second positioning tag are retrieved.

6. The laser positioning system according to claim 5, wherein the processing unit comprises a calculating element for defining a regression line according a least square function of the reflected light spot signals with the interval, and intersections of the regression line and the positions of the light beam projected on the first position tag and the second position tag are used to define the reference coordinate.

7. The laser positioning system according to claim 5, wherein the processing unit comprises a calculating element for defining the reference coordinate by obtaining a set of matching point cloud of reflected light spot signals within the interval.

8. The laser positioning system according to claim 6, wherein the calculating element determines a first line connecting the first position tag and the emitting center of the laser scanner according to the position of the first position tag, and then obtains a first intersection of the first line and the regression line, and the calculating element determines a second line connecting the second position tag and the emitting center of the laser scanner according to the position of the second position tag, and then obtains a second intersection of the second line and the regression line, and the relative positions of the laser scanner and the positioning board is calculated by taking an intermediate point of the first intersection and the second intersection as an origin of the reference coordinate.

9. The laser positioning system according to claim 1, wherein the positioning board is a plate having a plane, and the first position tag and the second position tag are disposed on two opposite regions of the plane.

10. The laser positioning system according to claim 1, wherein the positioning board comprises a pair of plates connecting with each other, and the first position tag and the second position tag are disposed on the pair of plates respectively.

11. The laser positioning system according to claim 10, further comprising a third position tag disposed on a boundary of the pair of plates connecting with each other.

12. A position measuring method for positioning a mobile carrier, wherein the mobile carrier is provided with a laser scanner, the position measuring method comprising:

projecting a light beam on a first positioning tag, a positioning board and a second positioning tag to correspondingly generate a first positioning signal, a plurality of reflected light spot signals and a second positioning signal by the laser scanner, wherein the first positioning tag and the second positioning tag are disposed on two opposite regions of the positioning board;

finding information of a position of the light beam projected on the first positioning tag and information of a position of the light beam projected on the second positioning tag by a processing unit, and filtering the reflected light spot signals to define a reference coordinate for the processing unit to calculate relative positions of the laser scanner and the positioning board according to the reference coordinate.

13. The position measuring method according to claim 12, wherein the processing unit comprises:
a light intensity detecting element, for finding the information of the position of the light beam projected on the first positioning tag and the information of position of the light beam projected on the second positioning tag according to a light intensity of the first positioning signals and a light intensity of the second positioning signal respectively.

14. The position measuring method according to claim 13, wherein the first positioning tag and the second positioning tag are light-reflecting tags or light-absorbing tags.

15. The position measuring method according to claim 13, wherein the light intensity of the first positioning signal and the light intensity of the second positioning signal are different from the light intensity of the reflected light spot signals.

16. The position measuring method according to claim 12, wherein the processing unit including a noise filtering element for filtering the reflected light spot signals according to the information of the position of the light beam projected on the first positioning tag and the information of the position of the light beam projected on the second positioning, and then the reflected light spot signals within an interval between the first positioning tag and the second positioning tag are retrieved.

17. The position measuring method according to claim 16, wherein the processing unit comprises a calculating element for defining a regression line according a least square function of the reflected light spot signals with the interval, and intersections of the regression line and the positions of the light beam projected on the first position tag and the second position tag are used to define the reference coordinate.

18. The position measuring method according to claim 16, wherein the processing unit comprises a calculating element for determining a plane equation according to regression analysis performed on a least square function of the reflected light spot signals within the interval and defining the reference coordinate by obtaining at least three intersections according to the plane equation and the positions of the light beam projected on the first positioning tag and the second positioning tag.

19. The position measuring method according to claim 16, wherein the processing unit comprises a calculating element for defining the reference coordinate by obtaining a set of matching point cloud of reflected light spot signals within the interval.

20. The position measuring method according to claim 17, wherein the calculating element determines a first line connecting the first position tag and the emitting center of the laser scanner according to the position of the first position tag, and then obtains a first intersection of the first line and the regression line, and the calculating element determines a second line connecting the second position tag and the emitting center of the laser scanner according to the position of the second position tag, and then obtains a second intersection of the second line and the regression line, and the relative positions of the laser scanner and the positioning board is calculated by taking an intermediate point of the first intersection and the second intersection as an origin of the reference coordinate.

21. The position measuring method according to claim 12, wherein the positioning board is a plate having a plane, and the first position tag and the second position tag are disposed on two opposite regions of the plane.

22. The position measuring method according to claim 12, wherein the positioning board comprises a pair of plates connecting with each other, and the first position tag and the second position tag are disposed on the pair of plates respectively.

23. The position measuring method according to claim 22, further comprising a third position tag disposed on a boundary where the pair of plates intersect.

* * * * *